United States Patent

[11] 3,616,995

| [72] | Inventor | Sakae Fujimoto |
| | | Tokyo, Japan |
| [21] | Appl. No. | 771,779 |
| [22] | Filed | Oct. 30, 1968 |
| [45] | Patented | Nov. 2, 1971 |
| [73] | Assignee | Kabushiki Kaisha Ricoh |
| | | Tokyo, Japan |
| [32] | Priority | Nov. 7, 1967 |
| [33] | | Japan |
| [31] | | 42/71560 |

[54] FILM COUNTER DEVICE FOR USE WITH A CAMERA USING NONPERFORATED FILM
1 Claim, 11 Drawing Figs.

[52] U.S. Cl. .................................................. 235/91 C
[51] Int. Cl. ................................................. G06m 1/00
[50] Field of Search ...................................... 235/91.3; 95/31

[56] References Cited
UNITED STATES PATENTS
| 1,888,134 | 11/1932 | Kunkler .................. | 235/116 X |
| 2,289,927 | 7/1942 | Crumrine ................ | 235/91 UX |
| 2,402,149 | 6/1946 | Crumrine ................ | 235/91 UX |
| 3,057,277 | 10/1962 | Swarofsky et al. ....... | 95/31 |

Primary Examiner—Richard B. Wilkinson
Assistant Examiner—John F. Gonzales
Attorney—Burgess, Ryan and Hicks ABSTRACT: A film counter device for use with a camera using nonperforated film provided with a cam in the form of a cardioid adapted to rotate in response to the rotation of a film winding spool. A pair of notched disks is disposed coaxially of said cam with each having only one notch with means for deviating or coinciding the notches in phase. A lever is provided whose one end is adapted to press against the cam while the other drives a film counter numeral indicating disk; and another lever is provided whose one arm is adapted to drop into both of the notches when the cam and the disks make substantially one rotation respectively so that the notches coincide in phase (in this case the numeral-indicating disk being rotated by one numeral) and whose other arm is provided with a lever adapted to prevent the rotation of the film winding spool.

PATENTED NOV 2 1971

INVENTOR

Sakae Fujimoto

BY Burgess, Ryan & Hicks
ATTORNEYS

INVENTOR
Sakae Fujimoto
BY Burgess, Ryan & Hicks
ATTORNEYS

3,616,995

FILM COUNTER DEVICE FOR USE WITH A CAMERA USING NONPERFORATED FILM

BACKGROUND OF THE INVENTION

The present invention relates to a film counter device for use in a camera and more particularly a film counter device for use in a camera using nonperforated film.

Of the various roll-films having a relatively larger size such as brownie size, the roll-films having backing paper have been widely used from a long time ago. Recently a new type roll-film in which only the leader and trailer portions are provided with backing paper has been marketed. In case of the latter type roll-film, since no backing paper is used to protect the film from light, the length of this type film is substantially two times the length of the conventional roll-film, but the diameters of the wound roll-films are the same in both of the conventional and new type films so that either of the roll-films may be loaded in the same camera as needs demand. For example, 12 exposures are possible in case of the conventional roll-film for 6 cm. × 6 cm. picture size, while 24 exposures are possible in case of the new type roll-film. Therefore, it is required for the camera, into which is loaded either of said roll-films as needs demand, that a film counter device for indicating the number of up to 24 exposures must be provided in the camera. The cameras having the film counter device capable of counting up to 24 exposures are marketed. However, the film counter device incorporated in the camera has an arrangement such that the film counter device has generally means for advancing one of a pair of disks in advance of the rotation of the other disk comprising said pair of disks each having the same number of notches at regular intervals around the periphery thereof, a spring adapted to deviate the relative phase of the notches of the disks substantially by one-half of one pitch of the notch and a toothed wheel for driving either of said disks and provided with a series of numerals marked around the periphery thereof. Consequently it is inevitable to increase the number of notches to be formed in the disk as the number of numerals marked thereupon is increased. However, in view of the technique of forming such notches having special shapes, it is impossible to provide such a large number of notches in one disk whose diameter is limited. Consequently, the diameter of the disk must be increased as the number of the numerals provided thereupon is increased. Thus, it becomes almost impossible to incorporate a film counter device having means such as described above so as to be compact in size in the camera.

SUMMARY OF THE INVENTION

In view of the above, in order to eliminate the defect encountered in the conventional film counter device of the type described, the present invention provides an improved film counter device wherein means of the type described above but having a cam in the form of a cardioid which is interlocked with the rotation of a film winding spool is utilized in a very sophisticated manner so that the advancement of the film by a length corresponding to the height or longitudinal length of nonperforated film is controlled with accuracy. A film counter numeral disk is intermittently actuated through a ratchet mechanism, and setting either to 12 or 24 exposures can be selectively effected from the operation exterior of the camera.

According to one aspect of the present invention, when the nonperforated film is advanced by a length corresponding to the height or longitudinal length of one picture frame, the cam in the form of a cardioid (referred to as "cardioid cam" hereinafter) which is interlocked with the winding spool makes one rotation. When the cardioid cam makes on rotation one arm of a lever which is pressed against the cam is caused to make one reciprocating motion so that the other end of the lever causes the numeral indicating disk to advance by one numeral. Coaxially of said cam are rotatable disposed a pair of disks each having only one notch. A lever having three arms (referred to as "three-arm lever" hereinafter) is provided in such a manner that a first arm presses against the peripheral edge of the numeral indicating disk, a second arm thereof presses against the periphery of either of said pair of disks and a third arm engages with a ratchet wheel which prevents the rotation of the winding spool. Since the notches of said pair of disks are not coincident in phase at the initiation of the rotation of the cardioid cam, said second arm of the three-arm lever will be prevented from dropping into both of said notches. However, since the notches coincide with each other in phase in the course of the rotation of the cardioid cam, when the film is advanced by one picture and at the same time the numeral-indicating disk is advanced by one numeral, then the second arm of the three-arm lever drops into both of said notches, whereby the three-arm lever is rotated, thereby preventing the further rotation of the winding spool. Even after the winding spool is prevented from rotating as described above, the winding knob is still permitted to rotate and is stopped when the shutter is fully energized. When the shutter is released, the three-arm lever is returned to its normal position, preparing for the next film-winding operation.

For example in case of the film for 12 exchanges, the numeral-indicating disk is stopped after the 12th exposure has been wound. After the whole length of the film has been wound, the back cover is opened so that the numeral indicating disk is returned or reset to its initial position. In case of the film having 24 exposures, a selection knob is set to the mark "24" which is marked on the outer surface of the camera body. When the winding knob is further rotated after the 24th or last exposure has been wound around and then the trailer portion is started to be wound, the three-arm lever is disengaged from both of the pair of notched disks and the ratchet wheel which is rotatable in unison with the winding spool, so that the film can be freely advanced and wound up completely around the winding spool.

Other objects and advantages of the present invention will be apparent from the following description of the preferred embodiment thereof, taken in conjunction with the accompanying drawings.

Figure 1:
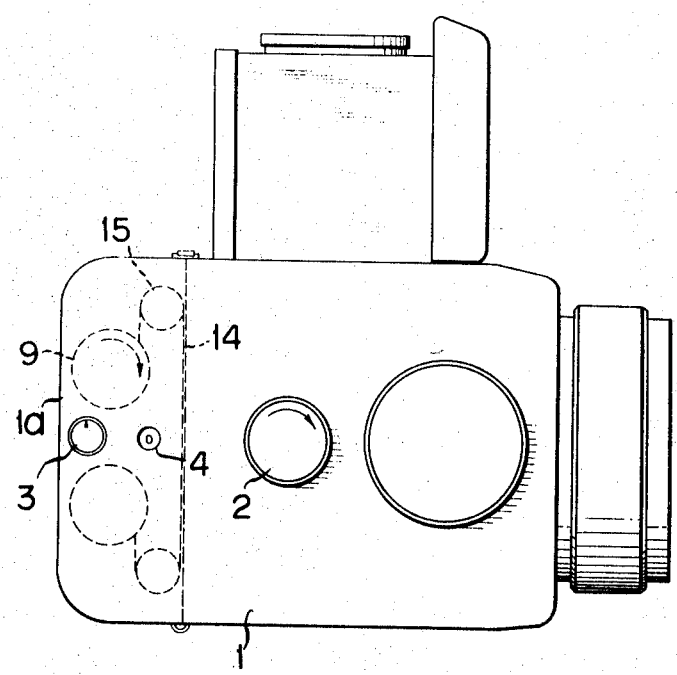
FIG. 1 is a side view of a single reflex camera incorporating a device of the present invention.
Figure 8:
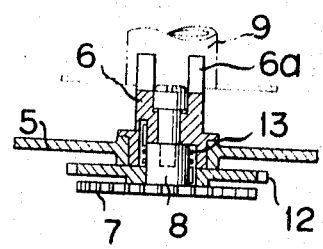
FIG. 8 is a sectional view taken along the chain line VIII—VIII of FIG. 2.

DESCRIPTION OF THE PREFERRED EMBODIMENT:

FIG. 1 illustrates the outer appearance of a single reflex camera which is incorporating the film counter device of the present invention and which is adapted to be mounted with a length of nonperforated film. Reference numeral 1 designates an outer case of the camera body; 1a, a back cover which is freely opened and closed; 2, a film-advancing knob for advancing or winding the nonperforated film; 3, a knob for switching the counter device either to 12 or 24 pictures or exposures counting; and 4, a window through which is observed a numeral indicating the number of pictures exposed. Reference numeral 5 shown in FIG. 8 is a wall of the camera case body which is spaced apart from an outer plaque of the camera by a suitable distance in parallel with and inwardly of this plaque. Within a flanged hollow shaft 6 loosely journaled by the wall 5 is disposed a stepped shaft 8 integral with a toothed wheel 7 in coaxial relation with the hollow shaft 6 in such a manner that the stepped shaft 8 may be prevented from being pulled outwardly of the wall 5. A spool for winding therearound the nonperforated film 9 has its one end loosely fitted over the inner end of the hollow shaft 6 in such a manner that the grooves or slots provided at said one end of the spool 9 according to the well-known manner engage with projections 6a in the form of plate formed integrally of the inner end of the flanged hollow shaft 6 so that the spool 9 may be rotated together with the flanged hollow shaft 6. The toothed wheel 7 made integral with the stepped shaft 8 is in mesh with a driving toothed wheel 10 (See FIG. 2) which in turn is in mesh with a toothed wheel 11 made integral with the knob 2 for winding the film. The toothed wheel 7 is further interlocked with a shutter charging mechanism not shown (See FIG. 2). A ratchet wheel 12 is loosely fitted over the stepped shaft 8 between the toothed wheel 7 and the flanged hollow shaft 6, and a coiled spring 13 which has normally substantial holding force is carried by the stepped shaft 8 and is located in the annular space defined between the coaxially disposed flanged shaft 6 and stepped shaft 8. One end of this spring 13 is fixed to the flanged hollow shaft 6 while the other end thereof is engaged in a slot provided in the ratchet wheel 12. Therefore, the flanged hollow shaft 6 and the ratchet wheel 12 are maintained in coaxial and corotatable relation with each other by said holding force of the spring 13. Now let it be assumed that the film-advancing or winding knob 2 shown in FIG. 1 is rotated in the direction indicated by the arrow, then the winding spool 9 is caused to rotate in the direction indicated by the arrow through the driving toothed wheel 11 and toothed wheels 10 and 7 so that the film loaded in the camera is advanced and wound around the spool 9. When the film is advanced, the film presses against a friction roller 15 so as to rotate the same. Therefore, a toothed wheel 16 which is coaxial and integral with the friction roller 15 (See FIG. 2) causes a toothed wheel 18 to rotate in the direction indicated by the arrow in FIG. 2 through an intermediate toothed wheel 17 which is pivoted by means of a pivot 17a to one end of one arm of a bellcrank 19 loosely fitted over a shaft 16a carrying the toothed wheel 16. At the other end of the bellcrank 19 is formed a projecting element 19a which is located in the travel path of a laterally projecting portion 27a of a sliding lever 27 which will be described hereinafter. The bellcrank 19 is imparted with a tendency of rotating in the counterclockwise direction about the pivot 16a and is adapted to normally engage the intermediate transmission toothed wheel 17 with the toothed wheel 18.

Figure 9:
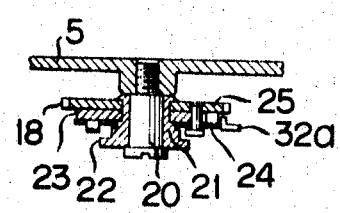
FIG. 9 is a sectional view taken along the chain line IX—IX of FIG. 2 illustrating means for advancing a disk through a very small angle provided with a cam in the form of a cardioid.
Figure 10:
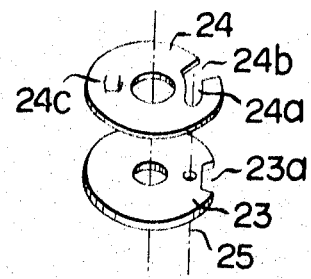
FIG. 10 is a perspective view illustrating two notched disks which are components of said means shown in FIG. 9.

As shown in FIG. 9, a fixed shaft 20 screwed to the wall 5 carries a stepped hollow shaft 21 having a cardioid cam 22 formed integrally at the outer end portion of the shaft 21 in such a manner that the shaft 21 is prevented from being pulled outwardly. Over the stepped hollow shaft 21 are fitted the toothed wheel 18 and two notched disks 23 and 24 (See FIG. 10). In this case, the toothed wheel 18 and the notched disk 23 are fixedly carried by the stepped hollow shaft 21 and the diameter of this notched disk 23 is made slightly larger than that of the notched disk 24 loosely fitted over the hollow shaft 21. A short slot 24a which is coaxial with the disk 24 and which opens outwardly through a notch 24b is formed in the disk at an offcentered portion thereof. A pin 25 which is fixedly secured to an offcentered portion of the toothed wheel 18 and is extending downwardly through the notched disk 23 is loosely fitted into the slot 24a. A spring 26 having a tendency to expand outwardly has its one end fixed to an ear or lug 24c which is formed by cutting one portion of the disk 24 and raising this portion as shown in FIG. 10. The other end of the spring 26 is engaged with the pin 25. Therefore, because of the spring 26 having the tendency of expanding outwardly, the notched disk 24 has a tendency to rotate in the counterclockwise direction with respect to the notched disk 23 made integral with the pin 25 through an angle in advance of the rotation of the notched disk 23 (See FIG. 2) within the permissible range determined by the length of the slot 24a. The notched disk 23 has a notch 23a formed at one portion of the peripheral edge thereof. When the pin 25 is located within the slot 24a as shown in FIG. 2, the notch 24b is located at a position advanced in phase by a small distance ahead of the notch 23a within the permissible range in which the pin 25 is permitted to displace within the slot 24a.

Figure 2:
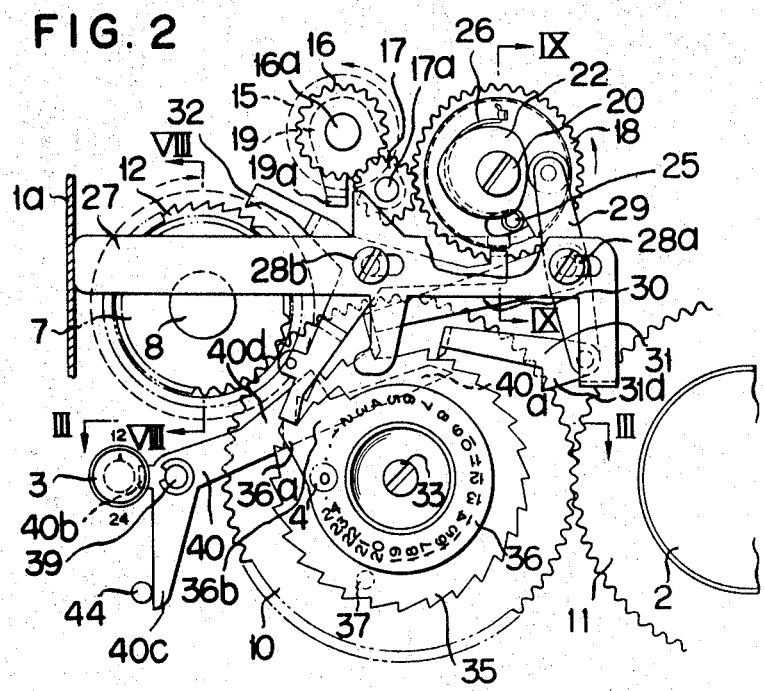
FIG. 2 is an enlarged side view illustrating the essential part of the device of the present invention which is attached upon a sidewall of a camera body, the style strip or plaque of the camera shown in FIG. 1 being taken away and the film counter device being set to the first photographing or exposure position of the film.
Figure 11:
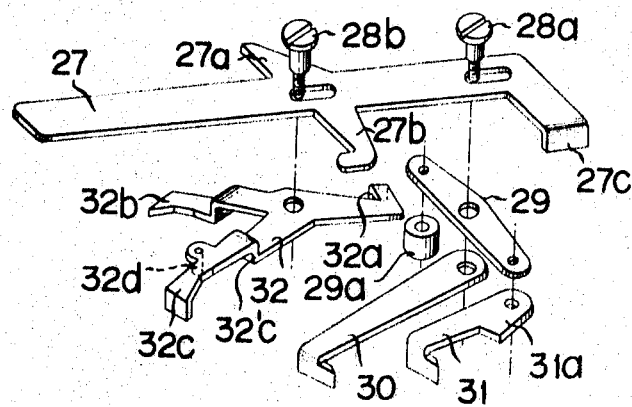
FIG. 11 is a perspective view illustrating a sliding lever interlocked with the opening and closing operation of the back cover of the camera and other elements which are adapted to make one reciprocating motion whenever the film is advanced by a distance corresponding to the height or longitudinal length of one picture frame.

As shown in FIGS. 2 and 11, the sliding lever 27 in the form of an inverted L which is interposed almost intermediate the toothed wheels 10 and 16 is attached to the wall 5 in such a manner that the lever 27 may slide in the horizontal direction by means of two stepped rivet shafts 28a and 28b which are loosely fitted in the slots provided in the lever 27. Intermediate the lever 27 are formed projecting members 27a and 27b integral with the sliding lever 27 and a bent portion 27c is formed integral with the lower end of the bent branch corresponding to the horizontal side of the "L." The sliding lever 27 is imparted with the tendency of moving toward the left in FIG. 2 by means of a spring not shown, but normally is located in the position shown in FIG. 2 because the free end of the sliding lever 27 is pressed by the back cover 1a.

The fulcrum point of a lever 29 as well as the base portion of a catch pawl 30 are pivoted to the rivet shaft 28a, and the roller 29a having a tendency of pressing against the outer periphery of the cardioid cam 22 is pivoted to one end of the lever 29, which is interposed between the wall of the main body of the camera and the sliding lever 27. At the other end of the lever 29 is pivoted the base portion of a pawl 31, which has a tendency of engaging with a ratchet wheel 35, which will be described hereinafter, by means of a spring not shown as in the case of the catch 30. At the base portion of the pawl 31 is formed stepped-down portion 31a having an inclined side edge, and when the sliding lever 27 is caused to be displaced toward the left in FIG. 2 upon opening of the back cover 1a, the bent portion 27c of the sliding lever 27 abuts against the inclined side edge 31a so that said pair of pawl 31 and the catch 30 are disengaged from the ratchet wheel (See FIG. 5).

A lever having three arms (referred to as "three-arm lever" hereinafter) 32 is pivoted to the rivet shaft 28b between the wall 5 and the sliding lever 27 and one arm of this three-arm lever has a tendency to drop into the notches of the notched disks 23 and 24 (See FIG. 11). That is, the bent projecting end of a first arm 32a of the three-arm lever 32 engages with the notches 23a and 24b of the disks 23 and 24 while the pawls formed at the free ends of the second and third arms 32b and 32c respectively are adapted to engage with the teeth of the ratchet wheel 12 and stepped portions 36a of a numeral indicating disk 36 which will be described in detail hereinafter. A pin 32d is fixedly secured to the third arm 32c.

Figure 7:
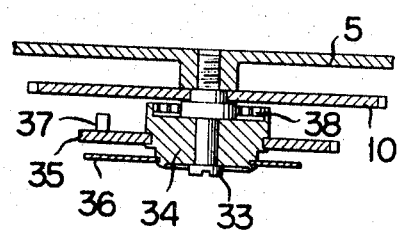
FIG. 7 is a sectional view taken along the chain line VII—VII of FIG. 3.

As shown in FIG. 7 a stepped fixed or stationary shaft 33 is screwed in position to the wall 5 of the camera body below the sliding lever 27, and the toothed wheel 10 and a hollow shaft 34 are loosely fitted over the stepped fixed shaft 33 in such a manner they are not pulled outwardly. The ratchet wheel 35 formed coaxially integral with the numeral indicating disk 36 is fitted over the hollow shaft 34. A pin 37 is fixedly secured to the ratchet wheel 35. At the outer surface and along the periphery of the numeral indicating disk 36 are marked numerals indicating the number of pictures exposed (see FIG. 2). At a suitable portion of the periphery of the numeral indicating disk 35 is formed a projecting portion having a stepped portion 36b formed immediately after a cutout portion 36a. A spiral coiled spring 38 is located in the groove formed around the hollow shaft 34 nearer the internal end thereof so as to be wound around the hollow shaft 34. One end of the spiral coiled spring 38 is fixed to the large diameter portion of the hollow shaft 33 while the other end thereof is fixed to one portion of a hollow shaft 34 made integral with the ratchet wheel 35. Therefore, the numeral indicating disk 36 made integral with the ratchet wheel 35 has a tendency to rotate in the clockwise direction in FIG. 2 about the hollow shaft 33 by means of the spring force of the spiral coiled spring 38, but since the projected step portion 36a engages with the pawl formed at the end of the third arm 32c of the three-arm lever 32, the numeral "0" is observed through the window 4 when the film is loaded and is prepared for taking the first picture as shown in FIGS. 1 and 2.

Figure 3:
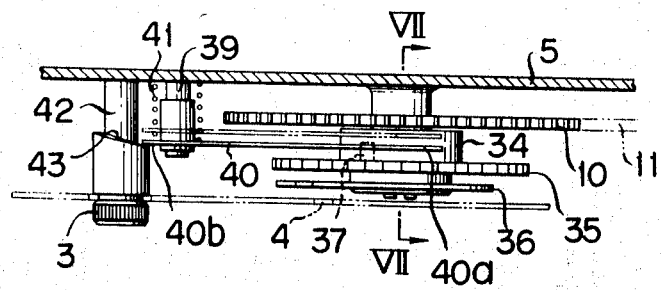
FIG. 3 is a view looking into the direction indicated by the chain line III—III of FIG. 2.
Figure 4:
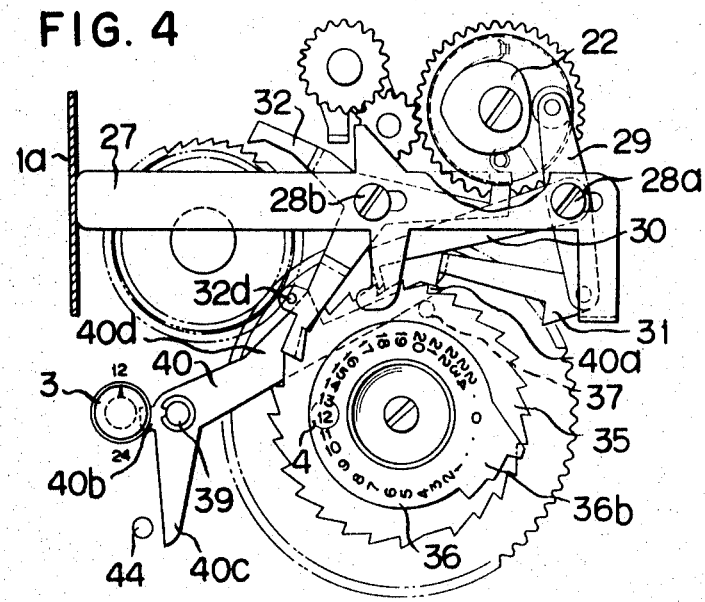
FIG. 4 is a side view illustrating the film counter device shown in FIG. 2 being in the state that the total of 12 pictures have been all exposed.

Between the switching or selection knob 3 disposed outwardly of the camera and the numeral indicating disk 36 is disposed a lever 40 which is loosely fitted over a shaft 39 fixedly secured to the wall 5 of the camera body in such a manner that the lever 40 may be displaced in the axial direction of the shaft or pivot 39. The lever 40 is biased outwardly by means of a coiled spring 41 (See FIG. 3) disposed between the inner side surface of the lever 40 and the wall 5, but is prevented from being pulled out of the end of the shaft 39. One arm 40a of the lever 40 is adapted to move into and away from the path of the rotation of the pin 37 by mean of an end cam 43 which will be described hereinafter. As shown in FIG. 4, when the pin 37 engages with the lower side edge of one arm 40a aof the lever 40, the leading end of the arm 40a causes the pawl 31 to disengage from the teeth of the ratchet wheel 35. A tongue element 40 b formed in the vicinity of the fulcrum point of the lever 40 presses against the end cam 43 formed at the inner end surface of a hollow shaft of the switching knob 3, which is loosely fitted to the wall 5, by means of the spiral coiled spring 41 as shown in FIG. 3. The lever 40 is imparted by means of a spring not shown with a tendency of rotating in the clockwise direction about the pivot 39 and the rotation is limited by a stop 44 extending from the wall 5. The stepped portion having an inclining edge 40d is formed at one side of the arm 40a.

The mode of operation of the film counter device of the present invention will be described in detail hereinafter. For the sake of convenience, it is assumed that a length of nonperforated film having 12 picture frames or exposures to be exposed is loaded in the camera.

First, the nonperforated film 14 is loaded in the camera and then the back cover 1a is closed. Next the index of the switching knob 3 is aligned to the index "12" marked on the plaque of the camera. Therefore, as shown in FIG. 3 the lever 40 is pressed by means of the spring 41 against the lowermost actuating surface of the end cam 43 so that the arm 40a of the lever 40 is moved into the path of rotation of the pin 37 (referred to as "projection" hereinafter) of the ratchet wheel 35.

Next, when the film winding knob 2 shown in FIG. 1 is rotated in the direction indicated by the arrow, then the toothed wheel 11 made integral with the knob 2 causes the stepped shaft 8 made integral with the toothed wheel 7 to rotate through the intermediate toothed wheel 10 so that the stepped shaft 8 causes the flanged hollow shaft 6 to rotate due to the strong holding force of the coiled spring 13, whereby the winding spool 9 connected in unison with the flanged hollow shaft 6 is rotated, thereby winding the film therearound. In this case, the friction roller 15 (See FIG. 1 and 2) is also rotated so that the toothed wheel 16 in coaxial relation with the friction roller 15 causes the notched disk 23 made integral with the toothed wheel 18 to rotate in the direction indicated by the arrow through the intermediate driving toothed wheel 17 which is in mesh with the toothed wheel 18. The bent projecting end of the first arm 32a of the three-arm lever 32 presses against the periphery of the notched disk 24 loosely fitted over the stepped hollow shaft 21 so that the rotation of the notched disk 24 is braked or retarded to some extent, but since the pawl of the third arm 32c of the three-arm lever 32 is pressed against the peripheral surface of the stepped portion 36b of the numeral indicating disk 36 so that the rotation of the three-arm lever 32 in the counterclockwise direction is limited, the knob 2 can be rotated continuously. That is, when the pawl of the third arm 32c of the three-arm lever 32 presses against the peripheral surface of the stepped portion 36b, the lever 29 having the roller pressing against the cardioid cam 22 which is rotated through the intermediate gear train is caused to make one reciprocation motion whenever the cam 22 makes one rotation about the rivet shaft 28a, so that the pawl 31 pivoted at the other end of the lever 29 causes the ratchet wheel to rotate by one tooth per rotation of the cam 22 in the counterclockwise direction in FIG. 2 while winding the spiral coiled spring 38. The above-described operation is continued until the pawl of the arm 32c of the three-arm lever 32 drops toward the base circle periphery from the stepped portion 36b of the disk 36 so that the leader portion of the film is wound around the spool 9. As soon as the pawl of the third arm 32c of the three-arm lever 32 disengages from the partial peripheral edge of the stepped portion 36b of the numeral indicating disk 36, the projected portion 32a of the three-arm lever 32 presses against the periphery of the notched disk 24 so as to retard the rotation thereof to some extent, so that only the other notched disk 23 is permitted to rotate in advance of the notched disk 24 through an angle determined by the length on the slot 24a of the notched disk 24, thereby energizing spring 26 which has the tendency of expanding outwardly. When the pin 25 of the notched disk 23 reaches the end of the slot 24a as shown in FIG. 2, then the notches 23a and 24b of the notched disks 23 and 24 coincide with each other so that the pin 25 pushes the rear end of the slot 24a whereby both of the notched disks 23 and 24 are made to rotate in unison in the direction indicated by the arrow in FIG. 2. Since the diameter of the friction roller 15 is so selected that a length of the film corresponding to the height or length of one picture frame is wound around the winding spool 9 when the cardioid cam 22 made integral with the stepped hollow shaft completes substantially one rotation, when the projected end of the first arm 32a of the three-arm 32 drops into the notches 23a and 24b which have been rotated in unison as described above, the pawl of the arm 32b of the three-arm lever 32 engages with the teeth of the ratchet wheel 12 so as to stop the rotation thereof. Thereafter, even if the winding knob 2 shown in FIG. 1 is continued to rotate in the direction indicated by the arrow, the rotation of the ratchet wheel 12 is prevented, but the toothed wheel made integral with the stepped shaft 8 (See FIG. 8) is interlocked with the winding knob 2 and continues its rotation. In this case, however, the holding force of the spring 13 is so reduced that the rotation is not transmitted to the flanged hollow shaft 6 so that only the toothed wheel 7 is caused to continuously rotate, thereby transmitting the power to the shutter-energizing mechanism (not shown) through a suitable gear train (not shown). In other words, it is required to rotate the winding knob 2 through a predetermined angle in order to energize the shutter mechanism, but after the shutter has been fully energized, the shutter-energizing mechanism stops its operation so that the rotation of the winding knob 2 is stopped. Thus, one operation of advancing the film has been completely finished, the numeral "1" marked on the numeral indicating disk is observed through the window 4 with the shutter being energized.

When the shutter button (not shown) is depressed in order to expose the first picture advanced, a suitable machine element (not shown) which is interlocked with the shutter button causes the three-arm lever 32 to rotate about the rivet shaft 28b through a very little angle in the clockwise direction in FIG. 2, so that the projecting end of the first arm 32a of the three-arm lever 32 is caused to disengage from both of the notches 23a 24b which have been maintained to coincide with each other. Then, due to the spring force of the spring 26, the notched disk 24 is caused to rotate with respect to the other notched disk 23 through a very little angle so that the notches 23a and 24b are displaced in phase. Therefore, even when the finger tip is relieved from the the shutter button, the projecting end of the first arm 32a of the three-arm lever 32 is kept pressing against the periphery of the notched disk 24 so that the pawl of the second arm 32b of the three-arm lever disengages from the teeth of the ratchet wheel 12, whereby the next film advancement of transportation becomes free to be made. In this state, the first picture is photographed.

Figure 5:
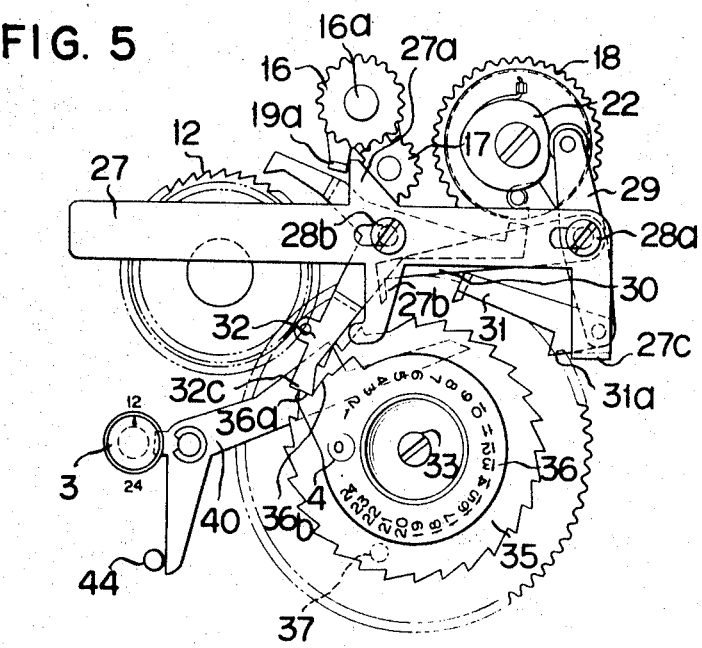
FIG. 5 is a view illustrating the state of the film counter device being reset when the back cover of the camera shown in FIG. 2 is opened so that the counter indicating disk is returned to its initial position.
Figure 6:
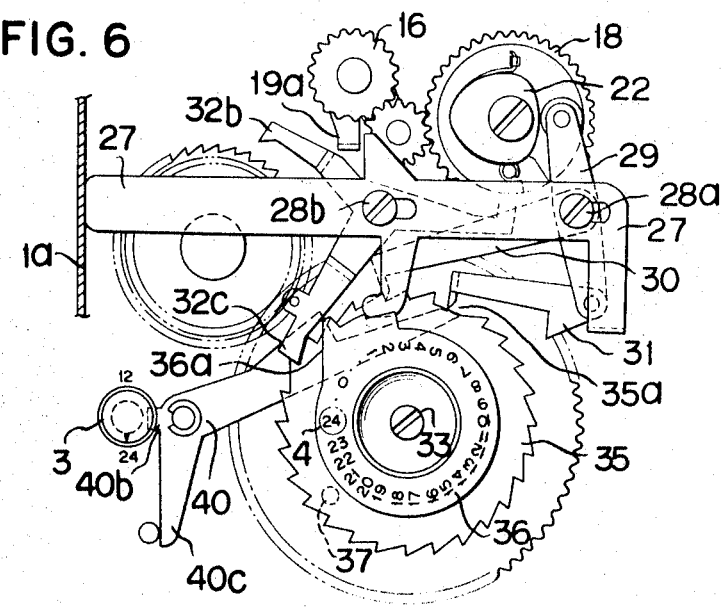
FIG. 6 is a side view illustrating the state in which the film counter device of the present invention is set to count the total of 24 pictures or exposures and the film counter indicating disk is just passing through the position showing the 24th picture or exposure.

Thus, when the above-described operation of winding the knob 2 and releasing the shutter is repeated, through the window 4 is observed a numeral of the numeral indicating disk 36 successively. When the film for the 12th or the last picture is advanced, the projection 37 of the ratchet wheel 35 abuts against the lower edge of the arm 40a of the lever 40 as shown in FIG. 4, so that the lever 40 is causes to rotate in the counterclockwise direction against its tendency to rotate in the clockwise direction about the pivot 39, whereby the end of the arm 40a causes the pawl 31 to disengage from the teeth of the ratchet wheel 35. In this case, even when the pawl 31 is disengaged from the ratchet wheel 35, the catch 30 remains engaged with the ratchet wheel 35 so that the numeral indicating disk 36 made integral with the ratchet wheel is not permitted to return by the stored energy of the spiral coiled spring 38 to its initial position. Next in order to wind around the spool the trailer portion of the film after the 12th picture has been photographed, as shown in FIG. 4, the inclining side edge 40d of the arm 40a causes the pin 32d of the third arm 32c to rotate about the rivet shaft 28b through a very little angle so as to disengage the pawl of the first arm 32a from the aforementioned means for rotating one disk in advance of the rotation of the other through a very little angle, whereby the winding knob can be rotated in the direction indicated by the arrow in FIG. 1. Next after the trailer portion of the film has been completely wound around the spool 9, the back cover 1a is opened. Then, as shown in FIG. 5, the sliding lever 27 is displaced toward the left by its own tendency by a distance determined by the length of the elongated slot. At the same time, the projecting portion 27a of the sliding lever 27 pushes the projecting element 19a of the bellcrank 19, the bellcrank 19 is caused to rotate about the pivot 16a in the clockwise direction in FIG. 5 whereby the intermediate driving toothed wheel 17 is out of mesh with the toothed wheel 18. At the same time, the other projecting portion 17b of the sliding lever 27 pushes one side edge of the third arm 32c of the three-arm lever 32 so that the three-arm lever 32 is caused to rotate about the pivot 28b in the clockwise direction in FIG. 5, whereby the pawl of the third arm 32c is extended to intervene in the path of rotation of the stepped portion 36a of the numeral indicating disk 36. Simultaneously, the depending portion 27c of the sliding lever 27 abuts against the inclining side edge of the pawl 31 so that the shoulder portion of the pawl 31 pushes up the lower side edge of the catch 30, whereby the catch 30 rotates about the rivet shaft 28a in the clockwise direction, thereby disengaging from the ratchet wheel 35. Consequently, the ratchet wheel 35 is caused to rotate about the pivot 33 in the clockwise direction by the spring force of the spiral coiled spring 38 (See FIG. 7) so that the stepped portion 36a of the numeral indicating disk 36 engages with the pawl of the third arm 32c of the three-arm lever 32. Thus, the numeral indicating disk 36 return to its initial position as shown in FIG. 2, and when the back cover 1a is closed again, then the sliding lever 27 is displaced to the position shown in FIG. 2 due to the pushing force of the back cover 1a so that the intermediate driving toothed wheel 17 is intermeshed with the toothed wheel 18 while the pair of pawl 31 and the catch 30 are in engagement with the ratchet wheel 35.

Next the mode of operation of the film counter device of the present invention when a length of nonperforated film for 24 pictures or exchanges is loaded in the camera.

As in the case of the film of 12 exposures, the nonperforated film having 24 pictures or exposures is loaded in the camera and the back cover 1a is closed. Next, the switching knob 3 is set to the numeral "24" marked on the plaque. In this case, since the tongue element 40b of the lever 40 is pushed upwardly to the position indicated by the chain line shown in FIG. 3 toward the uppermost end of the end cam 43 against the force of the spring 41, the end of the arm 40a of the lever 40 is retracted from the path of rotation of the projection 37 of the ratchet wheel 35 (See FIG. 3).

Next when the film winding knob 2 shown in FIG. 1 is rotated in the direction indicated by the arrow, the leading portion of the film whose length corresponds to a few picture frames is advanced without being exposed as in the case of the film for 12 pictures or exposures. Thus, when photographing is made, then the numeral indicating disk 36 is intermittently rotated as the film is advanced so that the number of pictures exposed is observed through the window 4 and the film is counted up to the last 24th picture or exposure. It will be clear from what has been described in detail with regard to the operation of winding the film and indicating the number of pictures exposed up to the 12th exposure that the same operation is effected in the case of the film for 24 pictures or exposures so that the description as to the mode of operation of the device when the film for 24 pictures or exposures will be not made.

When the 24th picture frame has been exposed and the film is wound up by the distance corresponding to one picture frame, the projecting portion 36a of the numeral indicating disk 36 pushes the side edge of the arm 32c having the pawl of the third arm 32c of the three-arm lever 32 so that the projecting end of the first arm 32a of the three-arm lever 32 can not drop into the notches 23a and 24b of the notched disks 23 and 24. On the other hand, the pawl 31 drops into a portion 35a of the ratchet wheel 35 where no tooth is provided so that the pawl 31 can not rotate the ratchet wheel 35. Consequently even if the winding knob 2 makes two rotations in order to wind the trailer portion of the film around the spool 9, the cardioid cam makes an idle rotation while the numeral indicating disk 36 remains stationary in engagement with the catch 30. The back cover 1a is opened after the trailer portion of the film has been wound around the spool 9, and then each of the components of the film counter device returns to its own initial position as in the case described in conjunction with the film for 12 pictures or exchanges.

As described hereinabove, according to the film counter device of the present invention, the film advancement of a length corresponding to the height of one picture frame can be controlled positively with accuracy by means for rotating one disk in advance of the rotation of the other disk through a very small angle, which comprises a cardioid cam adapted to interlock with the rotation of a spool for winding therearound the nonperforated film, two notched disks each having only one notch formed at a suitable portion of the periphery thereof and a spring having a tendency to expand outwardly in order to actuate said both of notched disks in unison. Thus controlled film-advancing movement is utilized in a sophisticated manner so that a numeral indicating disk for indicating the number of pictures exposed is intermittently actuated by means of the ratchet mechanism. Consequently, the number of the pictures exposed can be indicated correctly by means of the numeral indicating disk upon which are marked the numerals at an equal distance therebetween, independent of the increasing diameter of the nonperforated film wound around the spool. Furthermore, according to the present invention, said both notches of the notched disks are so arranged that they return to their initial relative positions without fail by means of the cardioid cam, so that the nonperforated film can be started to be advanced or wound from a predetermined starting portion thereof. Moreover, according to the present invention, the switching of the film counter device to a position for counting 12 pictures or exposures from a position for counting 24 pictures or exposures or vice versa can be effected by means of a sliding lever which is adapted to be moved into or away from the path of rotation of an offcentered projection of a ratchet wheel due to the cam profile of an end cam made integral with a film counter switching or selection knob, whereby the number of moving members or parts can be much reduced advantageously.

The present invention has been directed in detail with particular reference to a preferred embodiment thereof, but it will be understood that variations and modifications can be effected within the spirit and scope of the present invention as described hereinabove and as defined in the appended claim.

I claim:

1. A film counter device for use in a camera using nonperforated film comprising
    A. a film counter indicating mechanism comprising
        a. a shaft mounted on said camera, a wheel and a front disk fixed on said shaft, and second disk mounted on said shaft adjacent to said first disk, and said wheel has a pin projecting therefrom,
            i. said pair of disks each having a notch formed on its respective periphery, said second disk having an inner slot connection to its peripheral notch, and said notches being out of alignment with each other during photographing,
            ii. said first disk having an opening to be engaged by said pin which loosely fits within said slot to allow said misalignment,
            iii. a first rotatable lever having a first arm abutting said disks and selectively retarding the motion of said second disk during film winding thereby providing alignment of said notches so that said disks will rotate together, and
            iv. a spring having a tendency to expand outwardly being adapted to interlock said notched disks with each other;
        b. means rotatable about said shaft having a cam in the form of a cardioid for advancing the nonperforated film by a length equivalent to the height or longitudinal length of one picture frame of the nonperforated film;
        c. a numeral indicating disk coaxial with a ratchet wheel, said ratchet wheel having an offcentered projected portion and a portion of the periphery thereof which is not provided with any tooth,
            said numeral indicating disk having a radially projecting stepped portion;
        d. a spring for returning said numeral indicating disk to its normal position; and
        e. a second lever which abuts and is rotatable in response to the rotation of said cam, said lever having a pawl and an interlocked catch which rotates said ratchet wheel tooth by tooth;
    B. means for switching the film counter device from a position for counting 12 pictures or exposures of the nonperforated film to a position for counting 24 pictures or exposures or vice versa having
        a. a third lever which is adapted to be operated from the exterior of the camera in such a manner that one arm of said third lever engages with said pawl and said one arm may be moved into or away from the path of rotation of an offcentered projection of said ratchet wheel, said third lever being journaled by the camera main body; and
    C. means including said first rotatable lever which is interlocked to the operation of opening a back cover of the camera in such a manner that said first arm of said first rotatable lever disengages from said both notches of said pair of notched disks and a second arm is adapted to engage with said projecting stepped portion of said numeral indicating disk which is returned to its normal position by said second mentioned spring upon the disengagement of said pawl and catch from said ratchet wheel.

* * * * *